(12) United States Patent
Brzek et al.

(10) Patent No.: US 10,100,666 B2
(45) Date of Patent: Oct. 16, 2018

(54) HOT GAS PATH COMPONENT FOR TURBINE SYSTEM

(71) Applicant: General Electric Company, Schenectady, NY (US)

(72) Inventors: Brian Gene Brzek, Clifton Park, NY (US); Victor John Morgan, Greenville, SC (US); Benjamin Paul Lacy, Greer, SC (US)

(73) Assignee: General Electric Company, Schenectady, NY (US)

( * ) Notice: Subject to any disclaimer, the term of this patent is extended or adjusted under 35 U.S.C. 154(b) by 686 days.

(21) Appl. No.: 13/853,556

(22) Filed: Mar. 29, 2013

(65) Prior Publication Data

US 2014/0321994 A1    Oct. 30, 2014

(51) Int. Cl.
   *F01D 25/12*    (2006.01)
   *F01D 5/14*    (2006.01)
   (Continued)

(52) U.S. Cl.
   CPC .............. *F01D 25/12* (2013.01); *F01D 5/183* (2013.01); *F01D 5/186* (2013.01); *F01D 9/02* (2013.01);
   (Continued)

(58) Field of Classification Search
   CPC .......... F01D 5/182; F01D 5/183; F01D 5/184; F01D 25/12; F01D 9/02;
   (Continued)

(56) References Cited

U.S. PATENT DOCUMENTS 3,619,082 A    11/1971    Meginnis
5,605,046 A *    2/1997    Liang .................... F01D 5/183
                                                   60/266

(Continued)

FOREIGN PATENT DOCUMENTS

CN    2098556 U    3/1992
CN    1527922 A    9/2004
(Continued)

OTHER PUBLICATIONS

CN101173610 Translation, Yangping Wang, China, May 2008.*
(Continued)

*Primary Examiner* — Laert Dounis
*Assistant Examiner* — Kelsey Stanek
(74) *Attorney, Agent, or Firm* — GE Global Patent Operation; John Darling

(57) ABSTRACT

A hot gas path component for a turbine system is disclosed. The hot gas path component includes a shell and one or more porous media having an exterior surface and an interior surface and positioned adjacent the shell. The one or more porous media is configured to include varying permeability in one of an axial direction, a radial direction, an axial and a radial direction, an axial and a circumferential direction, a radial and a circumferential direction or an axial, a radial and a circumferential direction, the porous media is positioned adjacent the shell. The one or more porous media is further configured to control one of an axial, a radial, an axial and a radial, an axial and a circumferential, a radial and a circumferential or an axial, a radial and a circumferential flow of a cooling medium flowing therethrough.

19 Claims, 8 Drawing Sheets

(51) Int. Cl.
*F01D 9/02* (2006.01)
*F01D 5/18* (2006.01)
*F01D 9/04* (2006.01)

(52) U.S. Cl.
CPC ........ *F01D 9/041* (2013.01); *F05D 2300/514* (2013.01); *F05D 2300/612* (2013.01); *Y02T 50/672* (2013.01); *Y02T 50/673* (2013.01); *Y02T 50/676* (2013.01)

(58) Field of Classification Search
CPC ............ F01D 5/186–5/189; F01D 9/06; F01D 9/041; F05D 2260/203; F05D 2300/514; F05D 2260/201; F05D 2260/202; F05D 2300/612
USPC ........... 416/214 R, 97 A, 96 R, 96 A, 231 R, 416/231 B; 415/175, 115
See application file for complete search history.

(56) References Cited

U.S. PATENT DOCUMENTS

| | | | |
|---|---|---|---|
| 5,655,361 A | 8/1997 | Kishi | |
| 5,687,572 A | 11/1997 | Schrantz et al. | |
| 6,105,371 A | 8/2000 | Ansart et al. | |
| 6,746,755 B2* | 6/2004 | Morrison et al. | 428/166 |
| 7,422,417 B2 | 9/2008 | Landis | |
| 7,500,828 B2* | 3/2009 | Landis | 416/97 R |
| 7,597,533 B1 | 10/2009 | Liang | |
| 8,081,461 B2 | 12/2011 | Campbell et al. | |
| 2004/0146399 A1 | 7/2004 | Bolms et al. | |
| 2005/0249602 A1* | 11/2005 | Freling et al. | 416/241 B |
| 2006/0153685 A1 | 7/2006 | Bolms et al. | |
| 2006/0251515 A1* | 11/2006 | Landis | F01D 5/183 416/97 R |
| 2013/0156549 A1* | 6/2013 | Maldonado | 415/115 |
| 2014/0271153 A1* | 9/2014 | Uskert | F01D 5/187 415/177 |

FOREIGN PATENT DOCUMENTS

| | | |
|---|---|---|
| CN | 101173610 A * | 5/2008 |
| JP | 9041991 | 10/1997 |
| JP | 2013-543550 A | 12/2013 |

OTHER PUBLICATIONS

Lacy et al., "Hot Gas Path Component for Turbine System," U.S. Appl. No. 13/271,724, filed Oct. 11, 2012, 17 pages.

Unofficial English Translation of Chinese Office Action issued in connection with corresponding CN Application No. 201410041436.5 dated Jun. 1, 2016.

Notification of Reasons for Refusal issued in connection with corresponding JP Application No. 2014-009957 dated Oct. 10, 2017.

\* cited by examiner

HOT GAS PATH COMPONENT FOR TURBINE SYSTEM

This disclosure was made with government support under contract number DE-FC26-05NT42643 awarded by the Department of Energy. The government has certain rights in the disclosure.

BACKGROUND

The subject matter disclosed herein relates generally to turbine systems, and more specifically to hot gas path components for turbine systems.

Turbine systems are widely utilized in fields such as power generation, aircraft engines, and other types of turbines. For example, a conventional gas turbine system includes a compressor, a combustor, and a turbine. During operation of the gas turbine system, various components in the system are subjected to high temperature flows, which can cause the components to fail. Since higher temperature flows generally result in increased performance, efficiency, and power output of the gas turbine system, the components that are subjected to high temperature flows must be cooled to allow the gas turbine system to operate at increased temperatures, increased efficiency, and/or reduced emissions.

Various strategies are known in the art for cooling various gas turbine system components. For example, a cooling medium may be routed from the compressor and provided to various components. In the compressor and turbine sections of the system, the cooling medium may be utilized to cool various compressor and turbine components.

Nozzles are one example of a hot gas path component that must be cooled. For example, various parts of the nozzle, such as the airfoil, are disposed in a hot gas path and exposed to relatively high temperatures, and thus require cooling.

One solution for cooling a nozzle is to include an impingement sleeve inside the airfoil. Cooling medium is flowed to the interior of the nozzle, and then flowed through the impingement sleeve and onto an interior surface of the airfoil. This approach facilitates impingement cooling of the airfoil. However, while impingement sleeves do provide adequate cooling of nozzles, increased cooling efficiency is desired. Such increased efficiency would allow for a reduction in the cooling medium required to cool the nozzles, and thus a reduction in emission and/or increase in firing temperature.

It would therefore be desirable to provide an improved hot gas path component, such as an improved nozzle, for a turbine system. For example, a hot gas path component with improved cooling features would be advantageous.

BRIEF DESCRIPTION

These and other shortcomings of the prior art are addressed by the present disclosure, which provides a hot gas component for a turbine system.

In accordance with an embodiment, provided is a hot gas path component for a turbine system. The hot gas path component includes a shell having an exterior surface and an interior surface and one or more porous media having an exterior surface and an interior surface. The one or more porous media is configured to include varying permeability in one of an axial direction, a radial direction, an axial and a radial direction, an axial and a circumferential direction, a radial and a circumferential direction or an axial, a radial and a circumferential direction, the porous media is positioned adjacent the shell. The one or more porous media is configured to control one of an axial, a radial, an axial and a radial, an axial and a circumferential, a radial and a circumferential or an axial, a radial and a circumferential coolant flow distribution of a cooling medium flowing therethrough.

In accordance with another embodiment, provided is a hot gas path component for a turbine system. The hot gas path component includes a shell having an exterior surface and an interior surface and one or more porous media having an exterior surface and an interior surface. The one or more porous media is configured to include varying permeability along one of a major axis, through a thickness of the porous media, along a major axis and through a thickness of the porous media, along a minor axis and through a thickness, along a major axis and a minor axis, or along a major axis, a minor axis and through a thickness of the porous media, the porous media positioned adjacent the shell. The one or more porous media is configured to control coolant flow distribution along one of a major axis, through a thickness of the porous media, along a major axis and through a thickness of the porous media, along a minor axis and through a thickness, along a major axis and a minor axis, or along a major axis, a minor axis and through a thickness of the porous media of a cooling medium flowing therethrough.

In accordance with yet another embodiment, provided is a turbine system. The turbine system includes a compressor, a turbine coupled to the compressor, and a plurality of hot gas path components disposed in at least one of the compressor or the turbine. At least one of the hot gas path components includes a shell having an exterior surface and an interior surface and one or more porous media having an exterior surface and an interior surface. The one or more porous media is configured to include varying permeability in one of an axial direction, a radial direction, an axial and a radial direction, an axial and a circumferential direction, a radial and a circumferential direction or an axial, a radial and a circumferential direction, the porous media is positioned adjacent the shell. The porous media is positioned adjacent the shell. The one or more porous media is configured to control one of an axial, a radial, an axial and a radial, an axial and a circumferential, a radial and a circumferential or an axial, a radial and a circumferential coolant flow distribution of a cooling medium flowing therethrough.

Other objects and advantages of the present disclosure will become apparent upon reading the following detailed description and the appended claims with reference to the accompanying drawings.

BRIEF DESCRIPTION OF THE DRAWINGS

The above and other features, aspects, and advantages of the present disclosure will become better understood when the following detailed description is read with reference to the accompanying drawings in which like characters represent like parts throughout the drawings, wherein.

DETAILED DESCRIPTION

Figure 1:
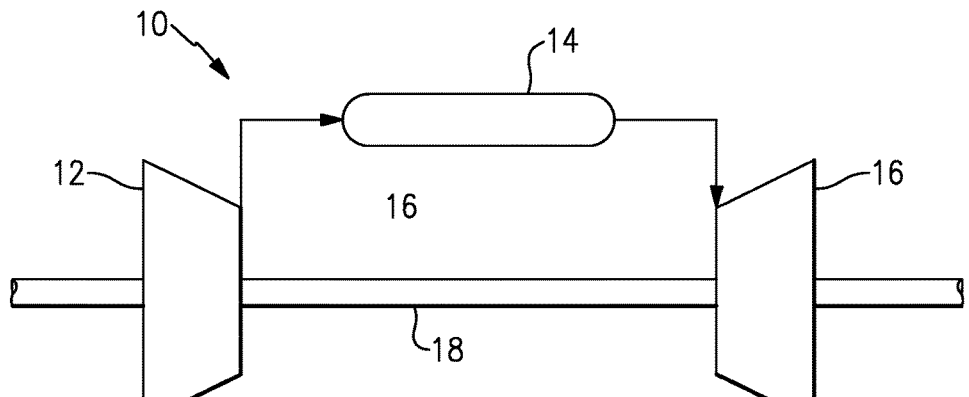
FIG. 1 is a schematic illustration of a known gas turbine system.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a schematic diagram of a known gas turbine system 10. The system 10 may include a compressor 12, a combustor 14, and a turbine 16. The compressor 12 and turbine 16 may be coupled by a shaft 18. The shaft 18 may be a single shaft or a plurality of shaft segments coupled together to form shaft 18.

The turbine 16 may include a plurality of turbine stages. For example, in one embodiment, the turbine 16 may have three stages. A first stage of the turbine 16 may include a plurality of circumferentially spaced nozzles and buckets. The nozzles may be disposed and fixed circumferentially about the shaft 18. The buckets may be disposed circumferentially about the shaft and coupled to the shaft 18. A second stage of the turbine 16 may include a plurality of circumferentially spaced nozzles and buckets. The nozzles may be disposed and fixed circumferentially about the shaft 18. The buckets may be disposed circumferentially about the shaft 18 and coupled to the shaft 18. A third stage of the turbine 16 may include a plurality of circumferentially spaced nozzles and buckets. The nozzles may be disposed and fixed circumferentially about the shaft 18. The buckets may be disposed circumferentially about the shaft 18 and coupled to the shaft 18. The various stages of the turbine 16 may be at least partially disposed in the turbine 16 in, and may at least partially define, a hot gas path. It should be understood that the turbine 16 is not limited to three stages, but rather that any number of stages are within the scope and spirit of the present disclosure.

Similarly, the compressor 12 may include a plurality of compressor stages (not shown). Each of the compressor 12 stages may include a plurality of circumferentially spaced nozzles and buckets.

Figure 2:
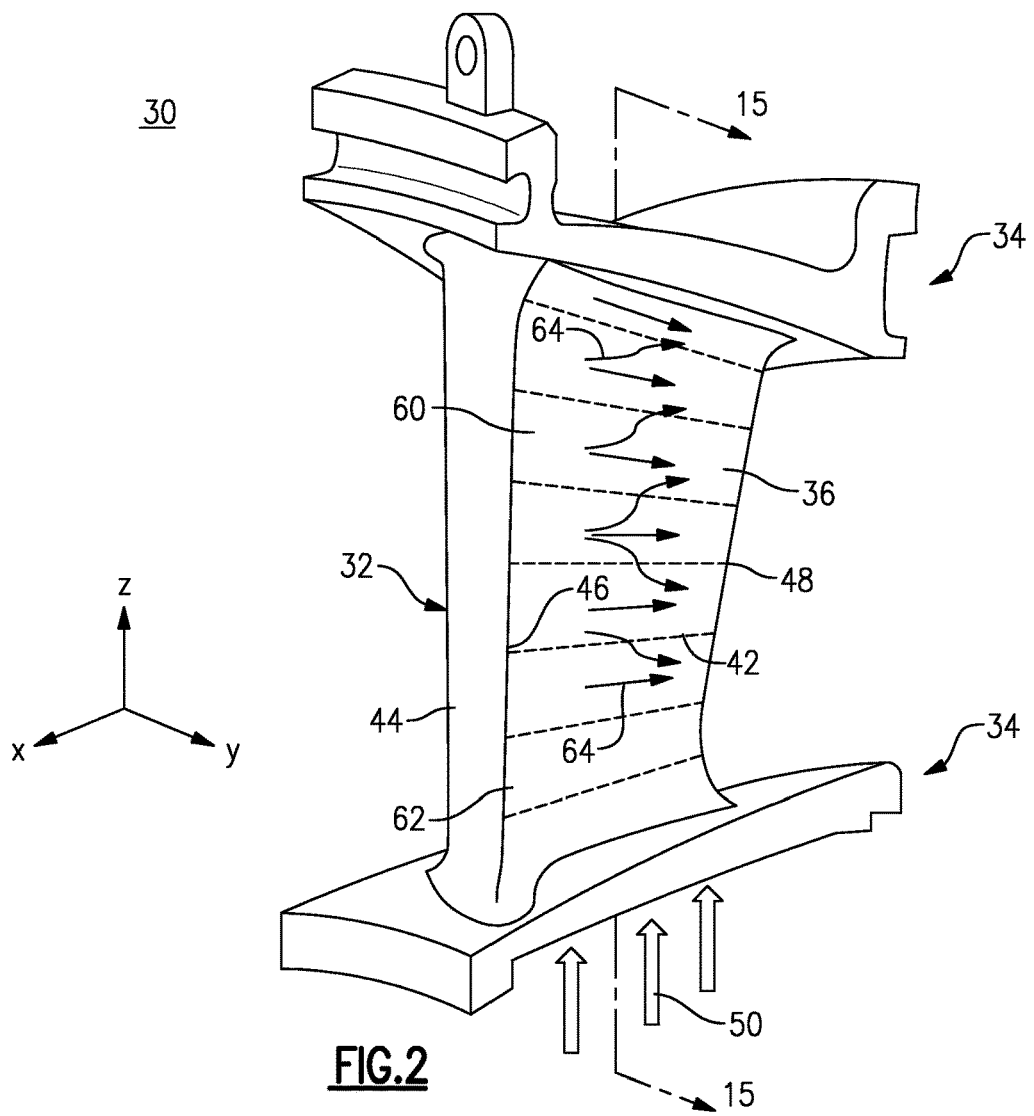
FIG. 2 is a perspective view of a portion of a hot gas path component in accordance with an embodiment of the present disclosure.
Figure 4:
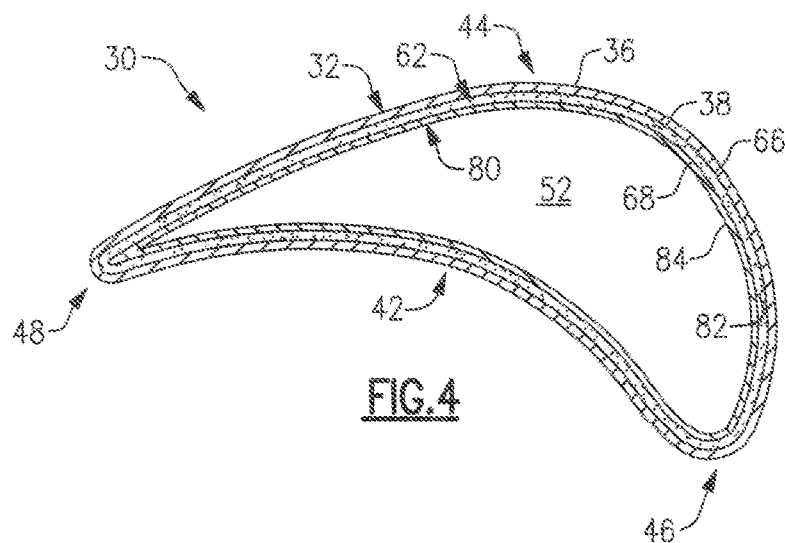
FIG. 4 is a top cross-sectional view of a hot gas path component in accordance with an embodiment of the present disclosure.

An exemplary hot gas path component, which may be included in the turbine 16 and/or the compressor 12, is shown by reference numeral 30 in FIG. 2. In exemplary embodiments as shown, the hot gas path component 30 is a nozzle. Alternatively, however, a hot gas path component 30 according to the present disclosure may be a bucket, a shroud block, or any other suitable component that may be disposed in the path of hot gases flowing through a turbine system 10. The nozzle 30 may include a shell 32. In exemplary embodiments, the shell 32 may be an airfoil that extends between end caps 34. In embodiments wherein the shell 32 is an airfoil, it may have a generally aerodynamic contour. For example, the shell 32 may have an exterior surface 36 and an interior surface 38 (FIG. 4). In embodiments wherein the shell 32 is an airfoil, the exterior surface 36 may define a pressure side 42 and suction side 44 each extending between a leading edge 46 and a trailing edge 48, or any other suitable aerodynamic contour. One or more of the end caps 34 may define an opening (not shown). The opening may allow cooling medium 50 to flow to an interior 52 of the shell 32, defined by an interior surface 38, as is generally known in the art.

As shown in FIG. 2, the hot gas path component 30 according to the present disclosure further includes one or more porous media 60. In the illustrated embodiment, the one or more porous media 60 are comprised of a plurality of porous media inserts 62 positioned adjacent to the interior 38 of the shell 32 and configured to include varying permeability in an axial (x) direction (along a minor axis), a radial (z) direction (along a major axis) and circumferential (y) direction (through a thickness) (described presently). The one or more porous media 60 are configured to control axial (along a minor axis), radial (along a major axis) and circumferential (through a thickness) coolant flow distributions, as indicated by arrows 64, of the cooling medium 50 flowing therethrough. Each of the one or more porous media 60 may be spaced apart from others of the one or more porous media 60, such as in the direction of the contour, such as the aerodynamic contour, of the shell 32 as shown or in any other suitable direction, or may abut or otherwise contact others of the one or more porous media 60. In an alternate embodiment, a single porous media 60 may be included and configured having varying permeability as described herein.

Figure 3:
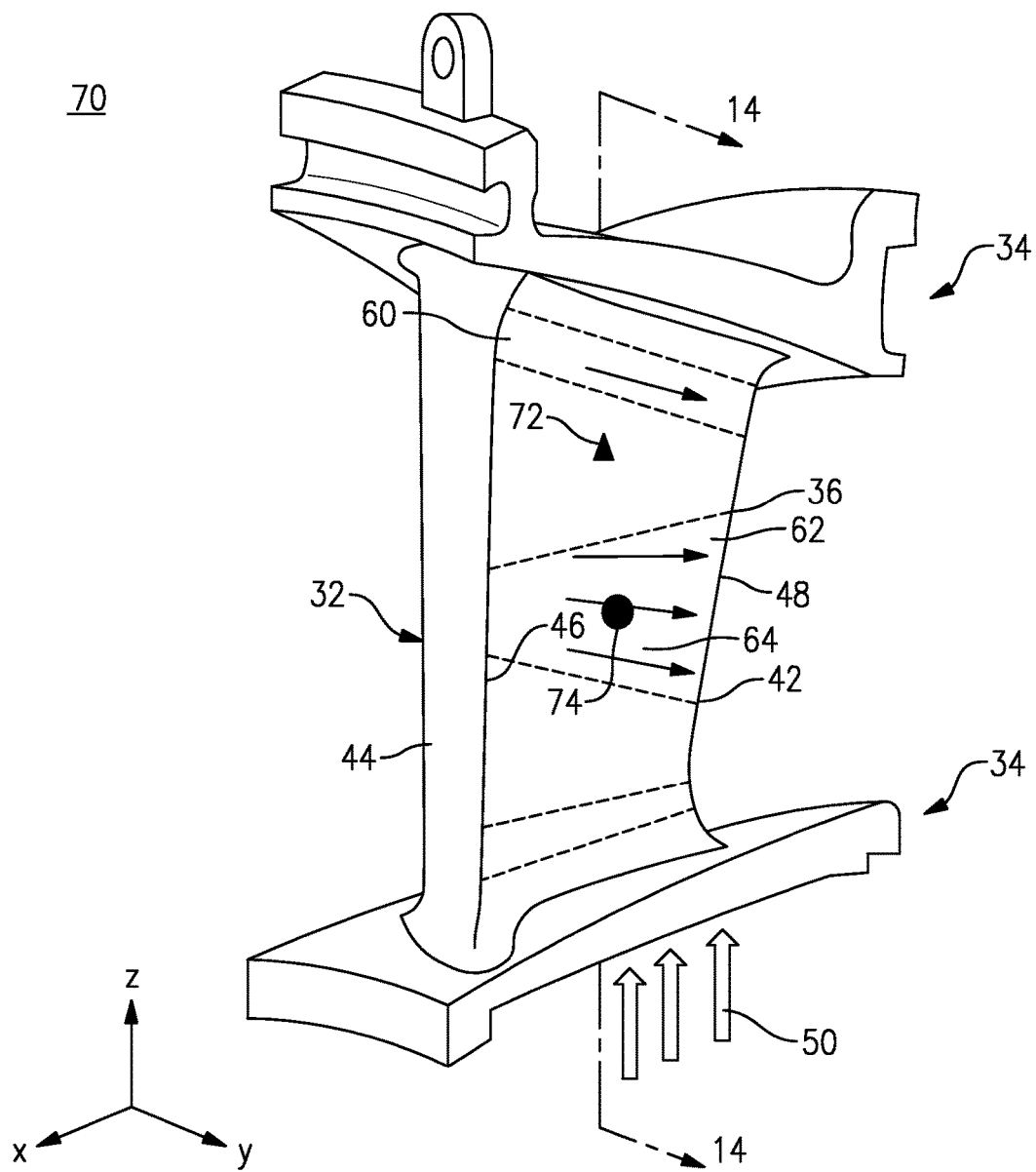
FIG. 3 is a perspective view of a portion of a hot gas path component in accordance with another embodiment of the present disclosure.

Another exemplary hot gas path component, which may be included in the turbine 16 and/or the compressor 12, is shown by reference numeral 70 in FIG. 3. It should be understood that like elements have like numbers throughout the various disclosed embodiments. In an exemplary embodiment as shown, the hot gas path component 70 is a nozzle, generally similar to hot gas path component 30 of FIG. 2. Alternatively, the hot gas path component 70 according to the present disclosure may be a bucket, a shroud block, or any other suitable component that may be disposed in the path of hot gases flowing through a turbine system 10. The nozzle 70 may include a shell 32. As previously described, the shell 32 may be an airfoil that extends between end caps 34. In embodiments wherein the shell 32 is an airfoil, it may have a generally aerodynamic contour including an exterior surface 36 and an interior surface 38 (FIG. 4). The exterior surface 36 may define a pressure side 42 and suction side 44 each extending between a leading edge 46 and a trailing edge 48, or any other suitable aerodynamic contour. One or more of the end caps 34 may define an opening (not shown). The opening may allow cooling medium 50 to flow to the interior 52 (FIG. 4) of the shell 32, defined by the interior surface 38, as is generally known in the art. In embodiments wherein the shell 32 is an airfoil, the exterior surface 36 may have a generally aerodynamic contour.

As shown in FIG. 3, the hot gas path component 70 according to the present disclosure further includes one or more porous media 60. In the illustrated embodiment, the one or more porous media 60 are comprised of a plurality of porous media inserts 62 positioned adjacent to the interior 38 of the shell 32 and configured to include varying permeability in an axial (x), radial (z) and circumferential (y) direction (described presently). In contrast to the embodiment illustrated in FIG. 2, in this particular embodiment, the one or more porous media 60 are configured about a known hot spot 72 and a known cool spot 74 within the hot gas path component 70. More particularly, the one or more porous media 60 are configured to control axial radial and circumferential coolant flow distributions about the known hot spot 72 and known cool spot 72, as indicated by arrows 64, to optimize the flow of the cooling medium 50 flowing therethrough and provide optimized cooling to a hot portion of the component 30.

Figure 5:
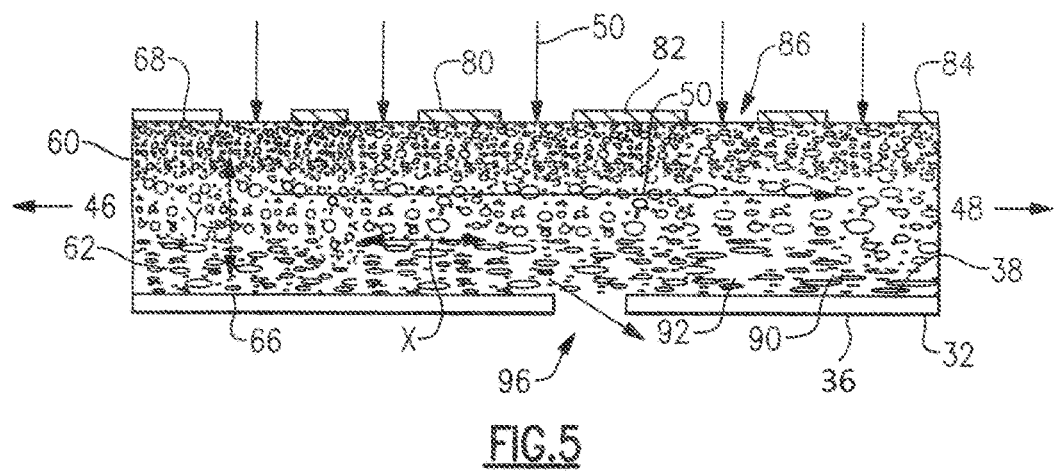
FIG. 5 is a close-up spanwise cross-sectional view of a portion of the hot gas path component of FIG. 4 in accordance with an embodiment of the present disclosure.

Referring now to FIGS. 4 through 15, illustrated are a plurality of embodiments illustrating the one or more porous media 60, including varying permeability in both an axial "x" and circumferential "y" direction. In some embodiments, the hot gas path component 30, 70 may further include an impingement sleeve 80, as shown in FIGS. 4 and 5 for the hot gas component 30. More specifically, illustrated in FIG. 4 is a top cross-sectional view of a hot gas path component, and more specifically a nozzle, in accordance with an embodiment of the present disclosure. FIG. 5 illustrates in a close-up spanwise or radial cross-sectional view, a portion of the hot gas path component of FIG. 4 in accordance with an embodiment of the present disclosure. In the illustrated embodiment, the impingement sleeve 80 may be disposed at least partially within the interior 52 of the shell 32, and spaced from the interior surface 38. The impingement sleeve 80 may have an exterior surface 82 and interior surface 84, and may have a contour similar to that of the shell 32. Further, the impingement sleeve 80 may define one or more impingement passages 86 (FIG. 5) extending between the interior surface 84 and the exterior surface 82. Cooling medium 50 flowed into the interior 52 of the shell 32 may be flowed through these impingement passages 86. In other embodiments, the hot gas path component 30, 70 may include any suitable sleeve therein. For example, a sleeve may include a plurality of spaced apart plates which allow cooling medium 50 to flow therebetween.

Such impingement passages 86 may have any suitable cross-sectional shape, such as circular or oval-shaped, square or rectangle shaped, triangular, or having any other suitable polygonal shape. For example, in some exemplary embodiments, the impingement passages 86 may have generally circular cross-sectional shapes, while in others the impingement passages 86 may have generally rectangular cross-sectional shapes and be characterized as slots.

As further illustrated in FIGS. 4 and 5, the hot gas path component 30 according to the present disclosure includes one or more porous media 60, and more particularly one or more porous media inserts 62, as previously described. Each of the one or more porous media 60 according to the present disclosure has an exterior surface 66 and an interior surface 68. In an embodiment, as best illustrated in FIG. 5, the exterior surface 66 is positioned adjacent the interior surface 38 of the shell 32. In embodiments, wherein the hot gas path component 30 includes an impingement sleeve 80, such as illustrated, or other suitable sleeve, the one or more porous media 60 are positioned between an interior surface 38 of the shell 32 of the hot gas path component 30 and the impingement sleeve 80 or other suitable sleeve, such that the exterior surface 82 of the impingement sleeve 80 is positioned adjacent the interior surfaces 68 of the porous media 60.

The one or more porous media 60 according to the present disclosure may advantageously allow improved cooling of the hot gas path component 30, such as of the shell 32. For example, in exemplary embodiments, the one or more porous media 60 allow for conductive heat transfer from the shell 32 due to the cooling medium 50 flowing generally through one or more porous media 60. In further embodiments, as discussed below, the one or more porous media 60 may additionally allow for impingement cooling of the shell 32, thus further improving cooling of the hot gas path component 30.

The one or more porous media 60 according to the present disclosure may be formed from any suitable porous material or materials having a matrix 90 and one or more voids 92. For example, in some embodiments, a one or more porous media 60, such as the matrix 90 thereof, may be formed from a metal or metal alloy foam, a ceramic foam, such as a ceramic matrix composite foam, or a carbon fiber foam. A foam is typically formed by mixing a material, such as a metal, ceramic, or carbon fiber, with another substance and then melting the substance away, leaving a porous foam. In other embodiments, the one or more porous media 60 may be formed from, for example, a plurality of packed together beads of a suitable material, or any other suitable material or materials. The one or more porous media 60 may thus be configured for flowing cooling medium 50 therethrough. The cooling medium 50 may flow through the voids 92 in the one or more porous media 60 before contacting the interior surface 38 of the shell 32, thus in exemplary embodiments facilitating convection cooling.

As shown in FIG. 5, in an embodiment, the one or more porous media 60 is continuous in the direction of the contour, such as the aerodynamic contour, of the shell 32, such that substantially all of a cross-sectional profile of the interior surface 38 is adjacent to the porous media 60. In other embodiments, only a portion of a cross-sectional profile of the interior surface 38 may be adjacent to the porous media.

Further, as illustrated in the figures, the one or more porous media 60 has multi-dimensional properties that control the local flow resistance, enabling the control of the cooling medium 50 to required areas. More particularly, the porous media 60 is configured to include varying permeability in one of an axial direction, a radial direction, an axial and a radial direction, an axial and a circumferential direction, a radial and a circumferential direction or an axial, a radial and a circumferential direction. The varying permeability of the porous media 60 enables control one of an axial, a radial, an axial and a radial, an axial and a circumferential, a radial and a circumferential or an axial, a radial and a circumferential coolant flow distribution of a cooling medium 50 flowing therethrough. The ability to control the local flow resistance of the one or more porous media 60 maximizes the cooling potential for a given amount of cooling medium 50. In an embodiment, the one or more porous media 60 is configured to include varying permeability in an axial "x", radial "z" and circumferential coolant flow distribution of the cooling medium 50 flowing therethrough. More particularly, the one or more porous media 60 may be configured to control axial, radial and circumferential flow distributions by tailoring the axial, radial and circumferential wall permeabilities and/or porosities to direct the flow of the cooling flow 50 to different areas of the component surface, e.g. the more permeable sections will have higher coolant flow. In the illustrated embodiment, the one or more porous media 60 has preferential permeability characteristics in the axial direction. In an embodiment, the permeability may be preferentially biased in the axial direction. This axial versus radial and circumferential tailoring may be custom defined to provide cooling to specific locations in need of such cooling.

In the embodiment illustrated in FIG. 5, the permeability of the porous media 60 is tailored to include varying permeability axially "x" across the porous media 60 from a leading edge 46 to a trailing edge 48 and circumferentially "y" across the bulk of the porous media 60. In this particular embodiment, the flow resistance is greater in a portion of the porous media 60 adjacent the impingement sleeve 80 and in a left-hand portion of the porous media 60 in an axial direction proximate the leading edge 46. By configuring the porous media 60 in this manner, the decreased flow resistance near the hot shell 32 and toward the trailing edge 48, creates a non-uniform flow distribution of the cooling medium 50 within the porous media 60, biased towards the hot component wall, and more particularly the hot shell 32, and the trailing edge 48. It should be anticipated that this non-uniform flow distribution of the cooling medium 50 may be achieved through the inclusion of a single porous media insert 62 of varying permeability in multiple directions, multiple porous media inserts 62 of varying permeability, or multiple porous media inserts 62 separated by thin solid (or low permeability porous media layers) oriented along the preferred direction of flow of the cooling medium 50.

As previously alluded to, in an embodiment, the hot gas path component 30 may include more than one porous media 60. Each of the plurality of porous media 60, in an embodiment comprising a plurality of porous media inserts 62, may be spaced apart from others of the one or more porous media 60, such as in the direction of the contour, such as the aerodynamic contour, of the shell 32 as shown or in any other suitable direction, or may abut or otherwise contact others of the plurality of porous medias 60.

As discussed above, in the embodiment illustrated in FIGS. 4 and 5, an impingement sleeve 80 may be positioned adjacent, such as in a spaced apart relationship or adjoining the interior surface 68 of a porous media 60. In these embodiments, cooling medium 50 may be flowed through the impingement passages 86 of the impingement sleeve 80 to the one or more porous media 60. In other embodiments, as shown in FIGS. 6 through 13, an impingement sleeve 80 may optionally be included in the hot gas path component 30.

In exemplary embodiments, the one or more porous media 60 may be in contact with the shell 32 and/or optional impingement sleeve 80. Thus, the exterior surface 66 of the porous media 60 may contact the interior surface 38 of the shell 32. The interior surface 68 of the porous media 60 may contact the exterior surface 82 of the impingement sleeve 80, when present. In some embodiments wherein the porous media 60 contacts the shell 32 and/or the impingement sleeve 80, the one or more porous media 60 may be press-fit, bonded such as through a suitable adhesive or bonding process, or otherwise connected to the shell 32 and/or impingement sleeve 80. In other embodiments, a one or more porous media 60 may be spaced from the shell 32 and/or the impingement sleeve 80. Thus, the one or more porous media 60 according to the present disclosure may be in contact with both a shell 32 and an impingement sleeve 80, may be spaced from both a shell 32 and an impingement sleeve 80, or may be in contact with one of a shell 32 or an impingement sleeve 80 and spaced from the other of a shell 32 or an impingement sleeve 80.

Figure 6:
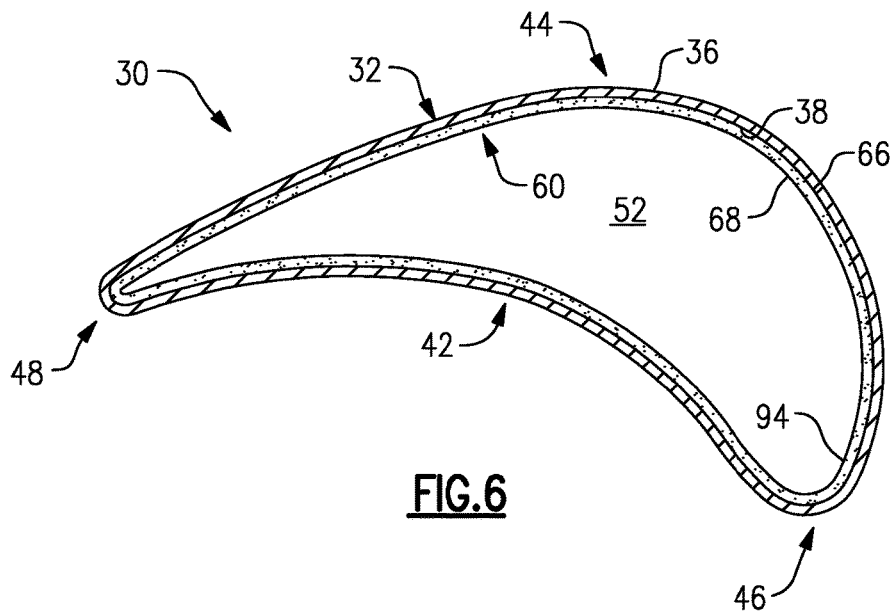
FIG. 6 is a top cross-sectional view of a hot gas path component in accordance with another embodiment of the present disclosure.
Figure 7:
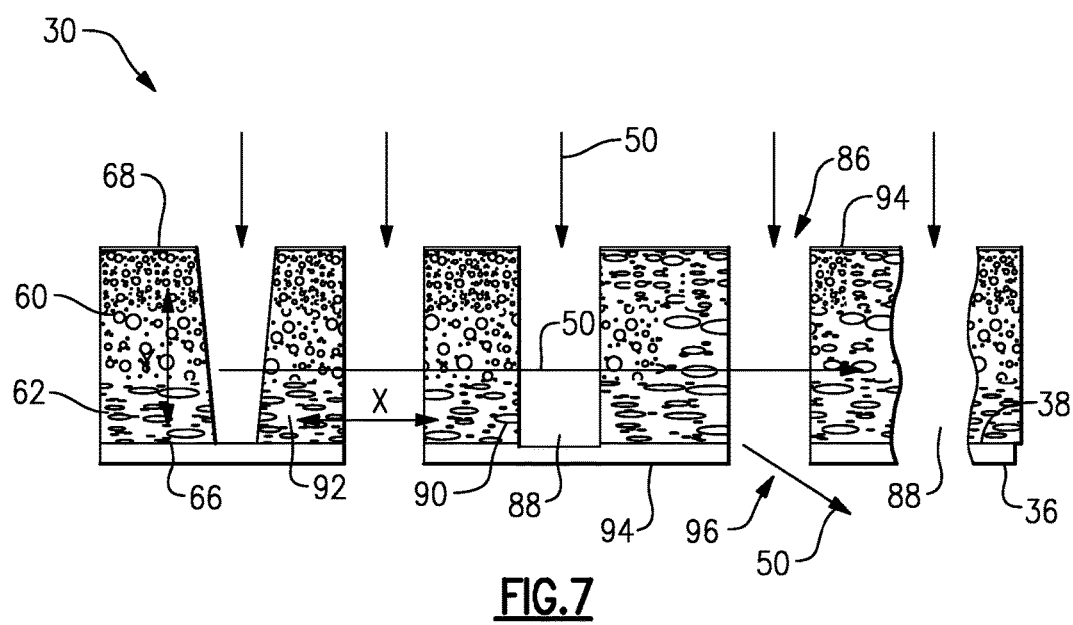
FIG. 7 is a close-up spanwise cross-sectional view of a portion of the hot gas path component of FIG. 6 in accordance with an embodiment of the present disclosure.

Referring now to FIGS. 6 and 7, in the exemplary embodiments as seen in FIGS. 4-13, and as best illustrated in FIG. 7, one or more impingement passages 88 may be further defined in a porous media 60. The impingement passages 88 may extend between the interior surface 68 and the exterior surface 66 of the porous media 60. Such impingement passages 88 may allow for portions of the cooling medium 50 to flow therethrough and impinge on the inner surface 38 of the shell 32, thus impingement cooling the shell 32. Further, portions of the cooling medium 50 may enter the impingement passages 86 flowing to the impingement passages 88 and then flow from the impingement passages 88 through the voids 92 in the porous media 60, thus otherwise facilitating cooling of the shell 32.

Similar to impingement passages 86 such impingement passages 88 may have any suitable cross-sectional shape, such as circular or oval-shaped, square or rectangle shaped, triangular, or having any other suitable polygonal shape. For example, in some exemplary embodiments, the impingement passages 88 may have generally circular cross-sectional shapes, while in others the impingement passages 88 may have generally rectangular cross-sectional shapes and be characterized as slots. The impingement passages 88 may have cross-sectional areas that are larger than, identical to, or smaller than those of the impingement passages 86. Further, the impingement passages 88 may have any suitable cross-sectional area, and this cross-sectional area may be constant throughout the length of the passage 88 or may vary, as illustrated in the furthest left impingement passage 88 of FIG. 7. For example, in some embodiments, a passage 88 may taper, or may have a constricted portion or a relatively larger portion.

Still further, the impingement passages 88 may be linear, curvilinear, or have any other suitable path. For example, in some embodiments, an impingement passage 88 may be curvilinear, having a generally serpentine path, such as illustrated in the furthest right impingement passage 88 of FIG. 7. In other embodiments, an impingement passage 88 may simply have a linear path.

An impingement passage 88 according to the present disclosure may be drilled or otherwise formed into a porous media 60. In embodiments wherein an impingement sleeve 80 is adjacent to the porous media 60, the impingement passages 86 in the impingement sleeve 80 may generally align with the impingement passages 88 of the porous media 60. In embodiments wherein the interior surface 68 of a porous media 60 is treated (described presently), the impingement passages 88 may extend through this treated surface.

Figure 8:
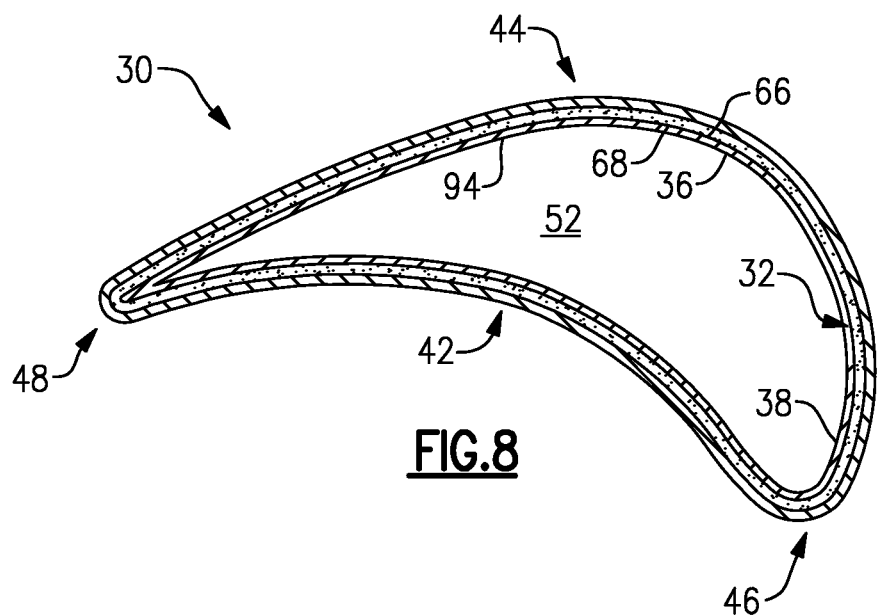
FIG. 8 is a top cross-sectional view of a hot gas path component in accordance with another embodiment of the present disclosure.
Figure 9:
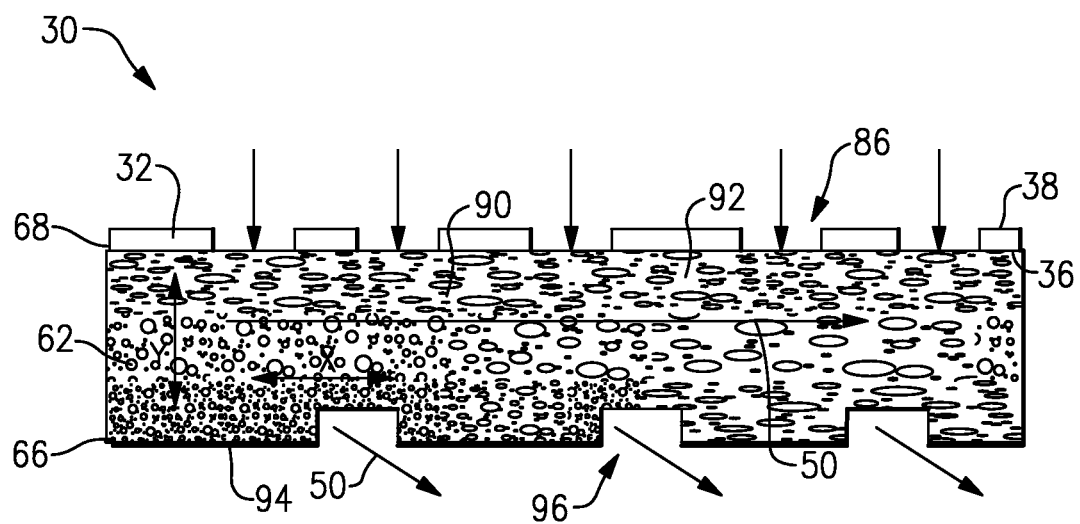
FIG. 9 is a close-up spanwise cross-sectional view of a portion of the hot gas path component of FIG. 8 in accordance with an embodiment of the present disclosure.

The shell 32 according to the present disclosure may further define one or more cooling passage 96, as shown in FIGS. 4 through 11. The cooling passages 96 may extend between the interior surface 38 and the exterior surface 36 of the shell 32, as illustrated in FIGS. 5, 7, and 9, or between an interior surface and exterior surface of a coating layer (described presently). Such cooling passages 96 may have any suitable cross-sectional shape, cross-sectional area, and cross-sectional path. As best illustrated in FIGS. 7 and 9, in some embodiments, the cooling passages 96 may be film cooling passages, and may be angled and formed such that cooling medium 50 flowed therethrough and exhausted therefrom then provides film cooling to the coating layer (described presently) and/or exterior surface 36 of the shell 32.

The one or more cooling passage 96 may be aligned with a porous media 60, or with an impingement passage 88 defined therein, as shown in FIG. 7. Cooling medium 50 flowing through the impingement passages 86 and/or 88 and porous media 60 may flow into and through the cooling passage 96. In some embodiments, as shown in FIG. 5, a cooling passage 96 extends only through the shell 32 between the interior surface 38 and exterior surface 36. In other embodiments, as shown in FIG. 9, a cooling passage 96 may further extend at least partially into and be at least partially defined in a porous media 60. For example, a cooling passage 96 may extend through the exterior surface 66 of a porous media 60, as shown.

As further shown in FIGS. 6 and 7, in some embodiments, the interior surfaces 68 of the porous media 60 may be treated, such as grinding, filling, brazing, welding, soldering, coating or any other suitable treating technique that would suitably seal the interior surface 68. Such treating may seal the interior surface 68, such that voids 92 defined in a porous media 60 do not extend to the interior surface 68. Passages, such as impingement passages 86, may then be formed through the treated surface. Cooling passages 96 may also be formed through shell 32, as discussed above, to allow cooling medium 50 to flow therethrough. In addition, one or more impingement passages 88, as previously described, may be further defined in the porous media 60. The impingement passages 88 may extend between the interior surface 68 and the exterior surface 66 of the porous media 60.

As further shown in FIGS. 8 through 11, in some embodiments, the one or more porous media 60 may be disposed on the exterior surface 36 of the shell 32. In an embodiment, as best illustrated in FIGS. 8 and 9, the one or more porous media 60 may be treated, such as with a TBC bond coat 94, or other coating layer. Such treating may seal the exterior surface 66 of the one or more porous media 60, such that voids 92 defined in the one or more porous media 60 do not extend to the exterior surface 66. Passages, such as impingement passages 86 may be formed through the shell 32 and/or impingement passages 88 may be formed through the treated exterior surface 66, as previously described, to allow cooling medium 50 to flow therethrough. One or more cooling passages 96 may be formed through the coating layer 94 as previously described. Treating of the exterior surface 66 may further include grinding, filling, brazing, welding, soldering, or any other suitable treating technique that would suitably seal the exterior surface 66.

Figure 10:
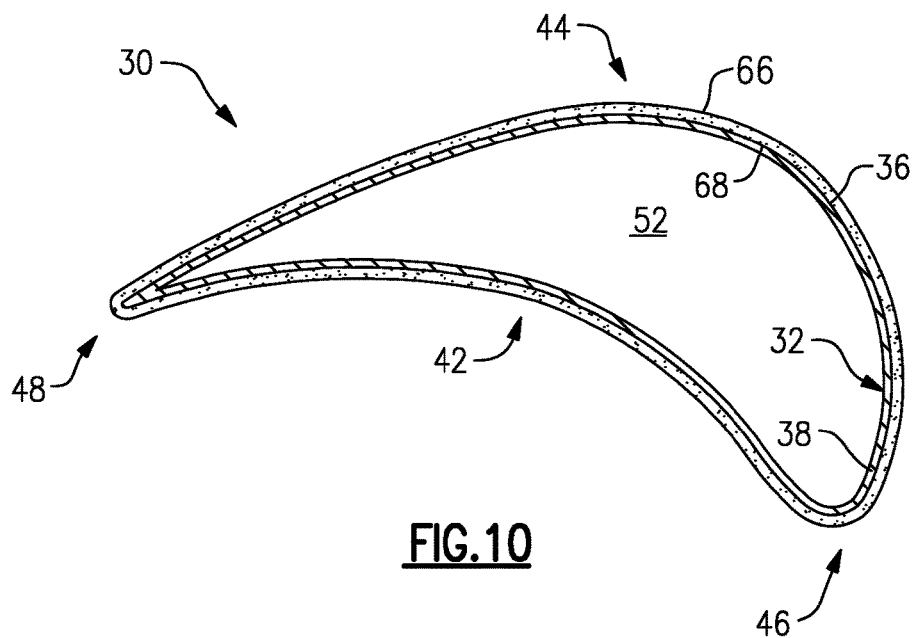
FIG. 10 is a top cross-sectional view of a hot gas path component in accordance with another embodiment of the present disclosure.
Figure 11:
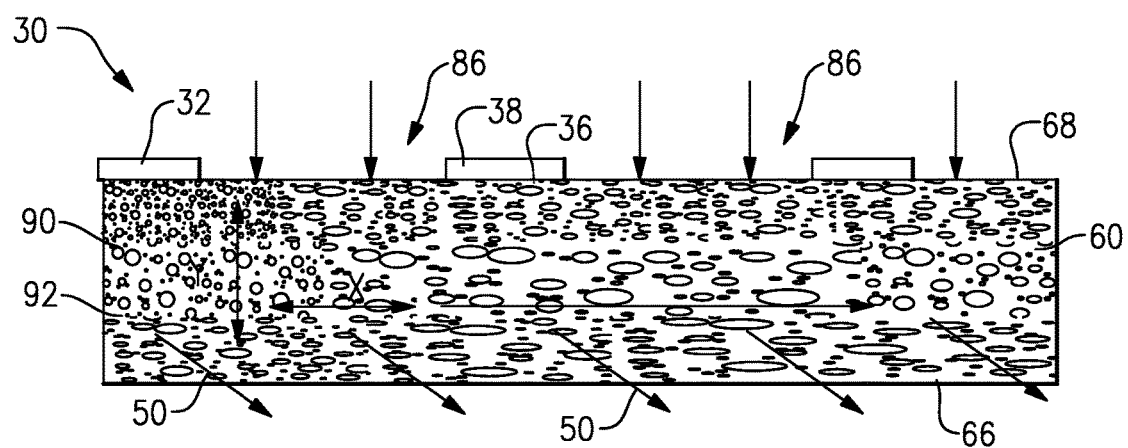
FIG. 11 is a close-up spanwise cross-sectional view of a portion of the hot gas path component of FIG. 10 in accordance with an embodiment of the present disclosure.

In an embodiment, as best illustrated in FIGS. 10 and 11, the one or more porous media 60 remains exposed and does not include a sleeve, such as impingement sleeve 86 previously described or a surface treatment, such as by grinding, filling, brazing, welding, soldering, or coating, such as with a TBC bond coat 94, or other coating layer, as previously described. In the embodiment described the flow of cooling medium 50 exits as transpiration cooling through the one or more porous media 60.

Figure 12:
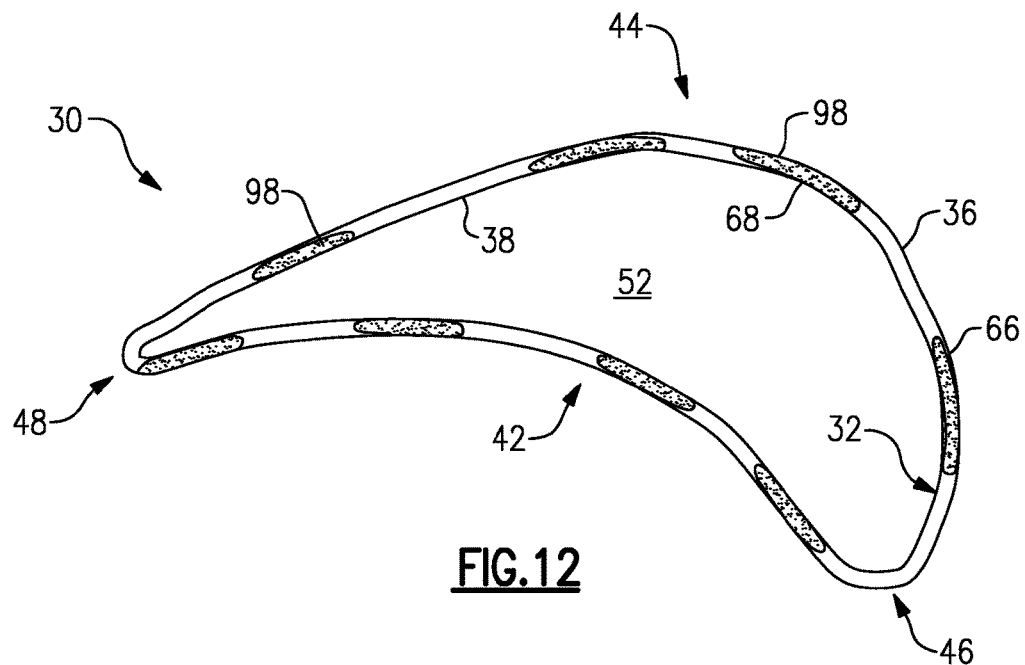
FIG. 12 is a top cross-sectional view of a hot gas path component in accordance with another embodiment of the present disclosure.
Figure 13:
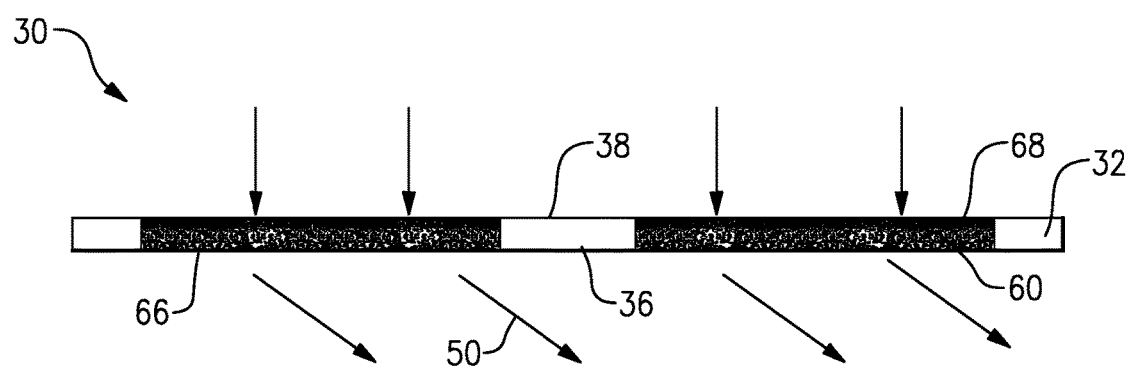
FIG. 13 is a close-up spanwise cross-sectional view of a portion of the hot gas path component of FIG. 12 in accordance with an embodiment of the present disclosure.

In yet another embodiment, as best illustrated in FIGS. 12 and 13, a porous media 60 may be disposed in-line with the shell 32 and include a plurality of discrete porous zones 98. In this embodiment, the flow of the cooling medium 50 exits through the porous media 60 as transpiration cooling. In an embodiment, the permeability and/or porosity of the plurality of discrete porous zones 98 and within the each porous zone 98 may be adjusted to place the maximum transpiration cooling where it is needed most. In an embodiment, if one section of an airfoil 30 has a higher heat load, the porous media 60 in that region may have the lowest permeability. Further, the downstream most portion of that porous media 60 may have the lowest permeability so the greatest amount of coolant medium 50 exits in this region.

Figure 14:
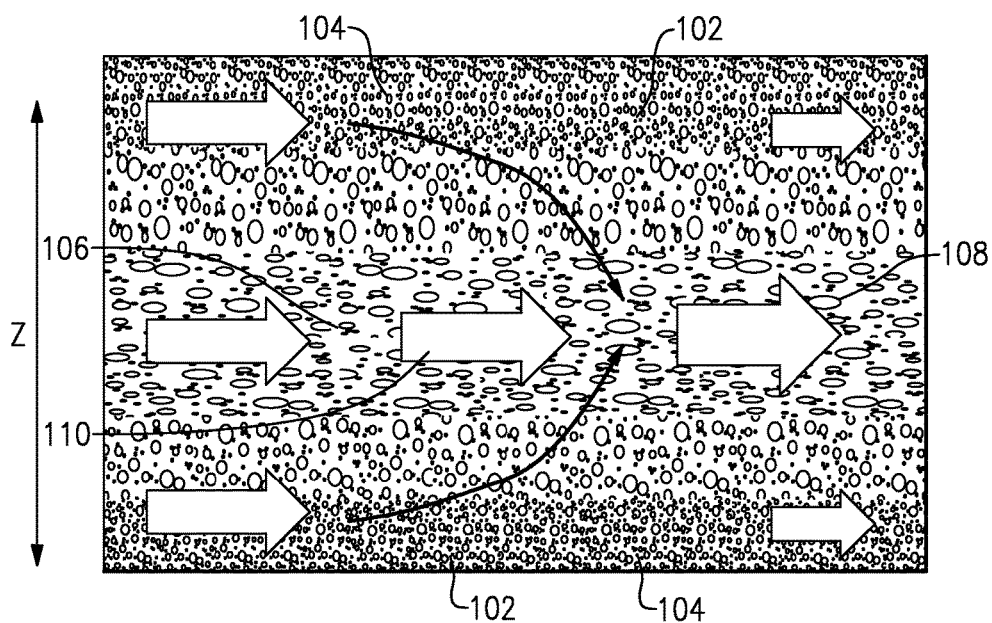
FIG. 14 is a close-up spanwise cross-sectional view taken through line 14-14 of FIG. 3 of a hot gas path component in accordance with an embodiment of the present disclosure.
Figure 15:
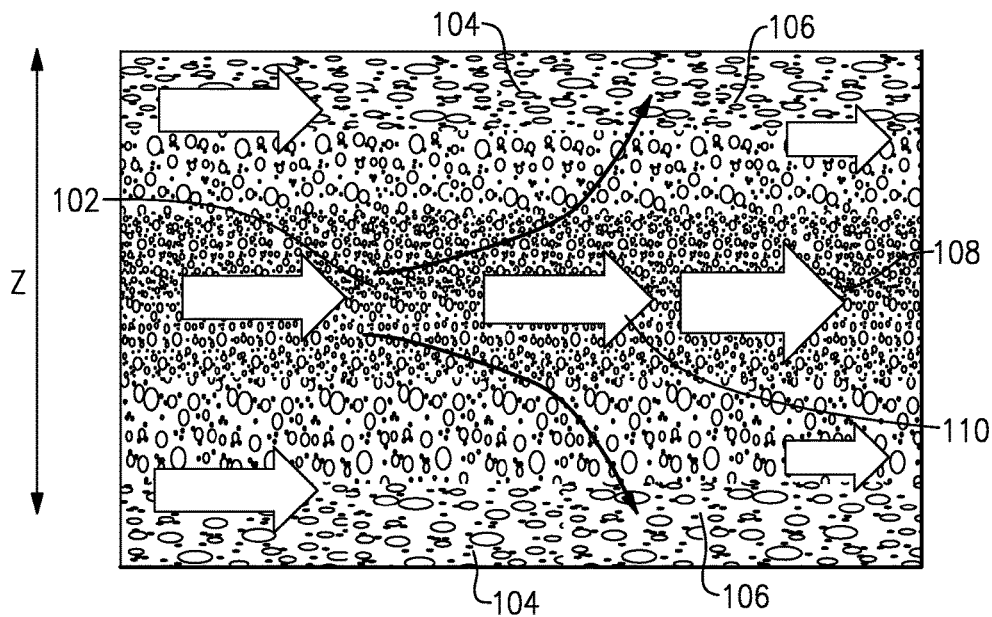
FIG. 15 is a close-up spanwise cross-sectional view taken through line 15-15 of FIG. 2 of a hot gas path component in accordance with an embodiment of the present disclosure.

Referring now to FIGS. 14 and 15, illustrated is a spanwise portion of a one or more porous media 60, including varying permeability and/or porosity to tailor and control the flow of the cooling fluid 50 therethrough. The one or more porous media 60, as previously described, includes multi-dimensional properties to control the local flow resistance, and thereby enabling the control of the cooling medium 50 to required areas. By tailoring the permeability and/or porosity of the one or more porous media 60, the flow resistance is able to be controlled to maximize the coolant potential for a given amount of cooling medium 50. More particularly, illustrated in FIG. 14 is a central spanwise portion of a hot gas component 100, generally similar to hot gas component 30 or 70, in which the one or more porous media 60 illustrates varying permeability and/or porosity in the spanwise direction as indicated by arrow "z". The one or more porous media 60, as illustrated, includes increased flow resistance 102 in an area adjacent the outer portions 104 of the span of the hot gas component 100 and decreased flow resistance 106 in an area adjacent a central portion 108 of the span of the hot gas component 100. As indicated by arrows 110, tailoring of the permeability and/or porosity of the one or more porous media 60, provides for an inward flow and an increase in the flow of coolant medium 50 in the central portion 108.

Referring now to FIG. 15, illustrated is a spanwise portion of a hot gas component 200, generally similar to hot gas component 30 or 70, in which the one or more porous media 60 illustrates varying permeability and/or porosity in the spanwise direction as indicated by arrow "z". In this particular embodiment, the one or more porous media 60, as illustrated, includes decreased flow resistance 106 in an area adjacent the outer portions 104 of the span and increased flow resistance 102 in an area adjacent a central portion 108 of the span. As indicated by arrows 110, the varying permeability and/or porosity of the one or more porous media 60, provides for an outward flow and an increase in the flow of coolant medium 50 in the outer portion 104.

Accordingly, described are embodiments of a hot gas component including a one or more porous media in which tailoring of the one or more porous media with regard to permeability and/or porosity, enables increased cooling in specific areas of the hot gas component. More particularly, by tailoring the permeability and/or porosity of the porous media in a spanwise direction (radial) and axial direction (flow of the hot gas path flow from a leading edge to a trailing edge), directional control of the flow of coolant medium, relative to the airfoil, is achieved. By varying the permeability and/or porosity of the porous media in the direction of the thickness or circumferential direction (if porous media is disposed on the sides normal to the leading/trailing edges) and/or axial (if porous media is disposed on the leading edge) and/or radial (if porous media is disposed on the endwalls) control of how much coolant is adjacent the airfoil surface is achieved.

This written description uses examples to disclose the embodiments, including the best mode, and also to enable any person skilled in the art to practice the embodiments disclosed herein, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hot gas path component for a turbine system, comprising:
   a shell having an exterior surface and an interior surface; and
   a porous media having an exterior surface and an interior surface, the porous media including varying permeability in one of an axial direction, a circumferential direction, an axial and a radial direction, an axial and a circumferential direction, a radial and a circumferential direction or an axial, a radial and a circumferential direction, the porous media positioned in contact with the shell,
   wherein the porous media directionally controls a cooling medium flowing therethrough in one of an axial direction, a circumferential direction, an axial and a radial direction, an axial and a circumferential direction, a radial and a circumferential direction or an axial, a radial and a circumferential direction.

2. The hot gas path component of claim 1, wherein the porous media includes a plurality of porous media inserts each including varying permeability to a cooling medium flowing therethrough.

3. The hot gas path component of claim 1, wherein the exterior surface of the porous media is positioned in contact with the interior surface of the shell.

4. The hot gas path component of claim 3, further comprising an impingement sleeve positioned in contact with the interior surface of the porous media.

5. The hot gas path component of claim 3, wherein the interior surface of the porous media is treated by at least one of grinding, filling, brazing, welding, soldering, and coating to seal the interior surface of the porous media.

6. The hot gas path component of claim 1, wherein the interior surface of the porous media is positioned in contact with the exterior surface of the shell.

7. The hot gas path component of claim 6, wherein the interior surface of the porous media is in contact with the exterior surface of the shell.

8. The hot gas path component of claim 6, wherein the exterior surface of the porous media is treated by coating with a coating layer to seal the exterior surface of the porous media.

9. The hot gas path component of claim 1, wherein the porous media is formed from one of a metal foam, a ceramic foam, or a carbon fiber foam.

10. The hot gas path component of claim 1, wherein the hot gas path component is a nozzle.

11. A hot gas path component for a turbine system, comprising:
    a shell having an exterior surface and an interior surface; and
    a porous media having an exterior surface and an interior surface, the porous media including varying permeability along one of a minor axis, a thickness of the porous media, a major axis and through a thickness of the porous media, a minor axis and through a thickness of the porous media, a major axis and a minor axis, or a major axis, a minor axis and through a thickness of the porous media, the porous media positioned in contact with the shell,
    wherein the porous media directionally controls a cooling medium flowing therethrough along one of a minor axis, through a thickness of the porous media, a major axis and through a thickness of the porous media, minor axis and through a thickness of the porous media, a major axis and a minor axis, or a major axis, a minor axis and through a thickness of the porous media.

12. A turbine system, comprising:
    a compressor;
    a turbine coupled to the compressor; and
    a plurality of hot gas path components disposed in at least one of the compressor or the turbine, at least one of the hot gas path components comprising:
    a shell having an exterior surface and an interior surface; and
    a porous media having an exterior surface and an interior surface, the porous media including varying permeability in one of an axial direction, a circumferential direction, an axial and a radial direction, an axial and a circumferential direction, a radial and a circumferential direction or an axial, a radial and a circumferential direction, the porous media positioned in contact with the shell,
    wherein in the porous media directionally controls a cooling medium flowing therethrough in one of an axial direction, a circumferential direction, an axial and a radial direction, an axial and a circumferential direction, a radial and a circumferential direction or an axial, a radial and a circumferential direction.

13. The turbine system of claim 12 wherein the porous media include a plurality of porous media inserts each including varying flow resistance in one or more of the axial direction, the circumferential direction, the axial and the radial direction, the axial and the circumferential direction the radial and the circumferential direction or the axial, the radial and the circumferential direction.

14. The turbine system of claim 12, wherein the exterior surface of the porous media is positioned in contact with the interior surface of the shell.

15. The turbine system of claim 12, wherein the interior surface of the porous media is positioned in contact with the exterior surface of the shell.

16. The turbine system of claim 12, further comprising an impingement sleeve positioned in contact with the porous media.

17. The turbine system of claim 12, wherein a surface of the porous media is treated by at least one of grinding, filling, brazing, welding, soldering, and coating to seal the surface of the porous media.

18. The turbine system of claim 12, wherein the hot gas path component is a nozzle.

19. The turbine system of claim 12, wherein the porous media is formed from one of a metal foam, a ceramic foam, or a carbon fiber foam.

* * * * *